June 6, 1961 P. KOLLSMAN 2,987,472
METHOD OF AND APPARATUS FOR INCREASING AND DECREASING THE
ION CONTENT OF FLUIDS BY ION TRANSFER
Filed Sept. 22, 1955 3 Sheets-Sheet 1

INVENTOR.
Paul Kollsman
BY
Howard G. Russell
his ATTORNEY

INVENTOR.
Paul Kollsman
BY Howard G. Russell
his ATTORNEY

June 6, 1961 P. KOLLSMAN 2,987,472
METHOD OF AND APPARATUS FOR INCREASING AND DECREASING THE
ION CONTENT OF FLUIDS BY ION TRANSFER
Filed Sept. 22, 1955 3 Sheets-Sheet 3

INVENTOR.
Paul Kollsman
BY Howard G. Russell
his ATTORNEY

United States Patent Office 2,987,472
Patented June 6, 1961

2,987,472
METHOD OF AND APPARATUS FOR INCREASING AND DECREASING THE ION CONTENT OF FLUIDS BY ION TRANSFER
Paul Kollsman, 100 E. 50th St., New York, N.Y.
Filed Sept. 22, 1955, Ser. No. 535,946
21 Claims. (Cl. 210—23)

This invention relates to the art of modifying the chemical composition of substances by a transfer of ions in a process commonly called dialysis.

The fundamentals of ion transfer are generally known. Briefly, the principle underlying dialysis is the fact that compounds in solution, for example, salt in water, split into atomic or molecular particles carrying positive and negative charges. Ways are known of selectively influencing, promoting or restricting the movement of these particles or ions. For example, substances are available which tend to adsorb negatively charged particles, also called anions, and other substances are available which tend to adsorb positively charged particles, also called cations. These substances can be formed into thin perforate ion discriminating walls, membranes or surface coatings with minute passages leading from one side to the other, the passage width being of the order of the size of the particles to be controlled, be it anions, cations, or colloidal particles which behave in a similar manner as the ions. Such membranes are generally referred to as permselective membranes. They are permeable to ions of one polarity and passage resistant to ions of the opposite polarity, depending on the polarity of the membranes.

It has also been proposed to change or modify the chemical composition of solutions by depletion of ions, the ions being removed by adsorption to the surface of granules or sheets of an ion discriminating substance. In some instances the known processes involve an exchange of ions, that is, certain ions are removed from the solution by adsorption and other ions go into the solution from the adsorbing material. After a certain lapse of time the ion depletion or exchange usually ceases and it is then necessary to regenerate the adsorbing substances to remove the adsorbed ions, whereafter the adsorbent material can be reused. The foregoing procedure may be termed ion-exchange by contact.

In the selective transfer and non-transfer of ionic constituents through selectively permeable barriers, such as membranes or films, it is common practice to apply an electrical potential, resulting in an electric current, by reason of the fact that anions tend to travel to the anode and cations tend to travel towards the cathode, as far as interposed selectively permeable barriers permit.

The present invention provides improvements in, and refinements of, the method of selectively transferring ions, as well as of apparatus for practicing the method, making the method and apparatus independent of the availability of an electromotive force and permitting continuous operation, without requiring periodic regeneration of the ion active material.

The present invention is particularly suited for the production of fresh water from sea water and, in general, for the deionization of liquids.

However, the invention has broader uses and application and is broadly applicable to processes for the modification of chemical composition either by ion depletion or by ion enrichment, it being obvious that both the depletion of ions from one fluid and the transfer of the removed ions into another fluid may be carried out for the purpose of producing two commercial products, one being the result of removal of ions, the other being the result of ion enrichment.

The various objects, features and advantages of this invention will appear more fully from the detailed description which follows, accompanied by drawings, showing for the purpose of illustration, apparatus for practicing the invention.

The invention also consists of certain new and original features of construction and combination of parts, as well as of steps and combination of steps, as hereinafter set forth and claimed.

Although the characteristic features of this invention which are believed to be novel will be particularly pointed out in the claims appended hereto, the invention itself, its objects and advantages, and the manner in which it may be carried out will be better understood by referring to the following description taken in connection with the accompanying drawings forming a part of it, in which:

Figure 1:
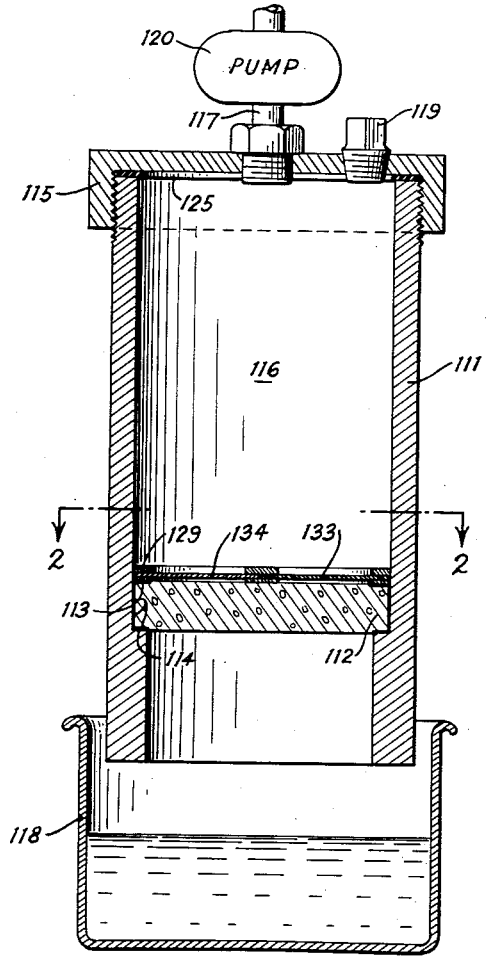
FIGURE 1 is a vertical cross-section through a laboratory-type apparatus.

In the following description and in the claims various details will be identified by specific names for convenience. The names, however, are intended to be generic in their application. Like reference characters refer to like parts in the several figures of the drawings.

In the drawings accompanying, and forming a part of, this specification certain specific disclosure of the invention is made for the purpose of explanation of broader aspects of the invention, but it is understood that the details may be modified in various respects without departure from the principles of the invention and that the invention may be applied to, and practiced by, other devices than the ones shown.

This specification is a continuation in part of my earlier application, Serial No. 178,384, filed August 9, 1950, entitled "Method of and Apparatus for Increasing and Decreasing the Ion Content of Fluids by Ion Exchange," now abandoned.

The principles and features of the invention, particularly of the method and method steps, are readily understood by first considering the basic structure of an apparatus for practicing it. FIGURE 1 is a sectional view of a simple apparatus particularly designed for demonstrating the invention on a laboratory scale.

A cylindrical housing 111 is subdivided into an upper chamber and a lower chamber by a porous disk 112, The disk 112 is peripherally sealed at 113 and rests on a shoulder 114 of the housing. A threaded cover 115 overlying a rubber gasket 125 closes the upper chamber 116 into which a fluid duct 117 leads. A filler plug 119 is provided in the cover and permits filling of the chamber 116, unless liquid is fed into the chamber through the duct 117.

The lower chamber is open and liquid which passes into it through the porous disk 112 may be collected in a suitable receptacle 118.

The chamber 116 may be put under hydrostatic pressure, the source of pressure being diagrammatically represented by a pump 120 in the duct 117.

The porous disk 112 of the illustrated apparatus has a diameter of two inches, is rigid and fluid pervious and has sufficient strength to withstand pressures of the order of 200 to 300 pounds per square inch. Porous porcelain, as used for filtering purposes in chemical apparatus, is a suitable material for the disk which has a thickness of one-half inch.

The disk 112 is covered on its top surface by a film 128 of polystyrene or polyethylene sheet material of a thickness of 0.003" and two substantially half-moon-shaped apertures are cut from the film 128 to leave a central bridge of ¼" in width and a peripheral rim of ⅛" in width. The total area of both apertures is approximately one square inch.

The film 128 and its half-moon-shaped apertures or windows are covered by two semi-circular pieces 133 and 134 of permselective membrane material. The two membrane pieces abut over the central bridge of the film 128 and overlie the peripheral portion of the film.

A cover disk 129 of polystyrene sheet material of a thickness of ⅛" overlies the membranes. The cover disk has the same configuration as the underlying film 128 and has windows or apertures in it registering with the apertures of the film 128.

The membrane portion 133 consists of anion permeable, cation passage resistant ion exchange material and the membrane 134 consists of cation permeable, anion passage resistant ion exchange material. Synthetic resinous ion exchange materials are well known in the art and a great number of them which are in commercial use are listed on pages 385 to 388 of the book "Ion Exchange" by F. C. Nachod, Academic Press, New York, 1949.

From the listed ion exchange materials two materials were selected, Amberlite IR–120, a high capacity sulphonic acid type cation exchanger and Amberlite IRA–400, a very basic anion exchanger, monofunctional in nature.

The Amberlites were formed into membranes by means of polystyrene as a binder according to a method disclosed by Wyllie and Patnode in The Journal of Physical and Colloid Chemistry, vol. 54, pp. 204–226, February 1950, the specific data being as follows:

The cation membrane was composed of granules of 100 mesh size of Amberlite IR–120 in Na form constituting 70% of the total membrane material and polystyrene granules of 200 mesh size constituting 30% of the total membrane material.

The anion membrane was composed of granules of 100 mesh size of Amberlite IRA–400 in Cl form constituting 70% of the total membrane material and polystyrene granules of 200 mesh size constituting 30% of the total membrane material.

The molding took place under pressure of 3000 lb. per square inch at 140 degrees centigrade maintained in a mold cavity for one minute, producing membranes of 1 mm. thickness which were then cut to size and installed in the apparatus.

Generally speaking the permselective membranes 133 and 134 are of a microporous structure permitting passage of ions therethrough, depending on the polarity of the membranes. The width of the membrane pores is of the general order of the size of the ions.

In distinction, the disk structure 112 is macroporous, that is to say that its pore size may be considerably larger.

For the purpose of demonstrating the principle and method of the invention an aqueous KCl solution of 0.25 N concentration was prepared by dissolving 9.3 g. of KCl in 5 liters of water. The concentration of the solution in terms of percent was 0.186.

*Test No. 1.*—The chamber 116 was filled with 9.5 cu. in. of KCl solution of 0.186% concentration having a resistance value of 147. 240 pounds of pressure per square inch was applied and maintained until one-half of the solution, 4.75 cubic inches was transferred through the membranes 133, 134 and the disk 112. The transferred solution was collected in the receptacle 118. The concentration of the solution remaining in the chamber 116 was measured and found to have a resistance value of 481 corresponding to a concentration of 0.074% KCl, a reduction to less than one-half of its original concentration, proving that the solute KCl passed through the barrier 133, 134, 112 faster than the solvent, water.

*Test No. 2.*—A second test was conducted to establish that the deionization of the solution in the chamber 116 was not due to ion exchange by contact but rather accomplished by the concentrating action of the membrane.

The membranes were soaked for one hour in an aqueous KCl solution of 15% concentration. The membranes were then soaked for three hours in an aqueous KCl solution of 0.186% concentration to exhaust any ion exchange capacity which they may possess.

The membranes were then used in two successive tests as follows:

(2A) The chamber 116 was filled with 9.5 cubic inches of 0.186% KCl solution and 250 pounds of pressure was applied until 4.75 cubic inches was transferred to the membranes. The resistance value was then determined and found to be 493 in the liquid in the chamber 116 and 135 in the liquid in the receptacle 118. The two liquid volumes were removed and evaporated with the following results:

The solution in the chamber 116 yielded 59 mg. of KCl. The concentrate collected in the receptacle 118 yielded 227 mg. of KCl.

(2B) The test was then repeated with the following results:

Resistance value of the solution remaining in the chamber 116—479. Resistance value of the solution collected in the receptacle 118—137. KCl recovered of the dilute remaining in the chamber 116—61 mg. KCl recovered from the concentrate—223 mg.

The results of the three tests, compared, are as follows:

|  | Test 1 | Test 2A | Test 2B |
| --- | --- | --- | --- |
| Concentration before passage through membrane in terms of normalcy | 0.25 N | 0.25 N | 0.25 N |
| In terms of percent | 0.186 | 0.186 | 0.186 |
| Resistance value | 147 | 147 | 147 |
| Pressure, pounds | 240 | 250 | 250 |
| Volume of fluid transferred, cubic inches | 4.75 | 4.75 | 4.75 |
| Resistance value, High pressure side | 481 | 493 | 479 |
| Concentration, High pressure side, percent |  | 0.076 | 0.079 |
| Resistance value, Low pressure side |  | 135 | 137 |
| Concentration, Low pressure side, percent |  | 0.282 | 0.287 |
| Recovery of KCl by evaporation: |  |  |  |
| High pressure side, milligrams |  | 59 | 61 |
| Low pressure side, milligrams |  | 227 | 223 |
| Total KCl recovery, milligrams |  | 286 | 284 |
| Total KCl in 9.5 cu. in. (155.8 cc.), milligrams |  | 290 | 290 |
| Recovery within, percent |  | 2 | 2 |
| Substance recovered analyzed and found to be: |  |  |  |
| High pressure side |  | KCl | KCl |
| Low pressure side |  | KCl | KCl |

*Test No. 3.*—A further test was conducted with the membrane materials disclosed by Meyer and Straus in Helvetica Chimica Acta, vol. 23 (1940), pp. 795–800).

Membranes were prepared according to the directions given in the article, the cation permeable membrane consisting of cellophane treated with Chloranthin-Lichtbraun BRLL. The anion permeable membrane consisted of Naturin which was methylated as directed in the article.

Figure 2:
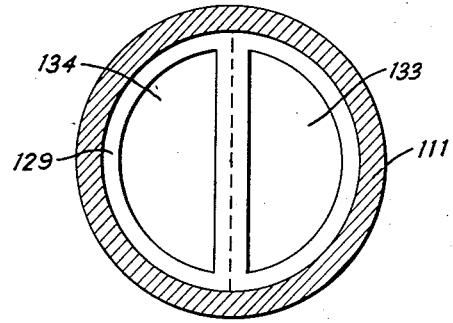
FIGURE 2 is a sectional plan view, the section being taken on line 2—2 of FIGURE 1.

The membranes were then installed in the apparatus shown in FIGURES 1 and 2 and the following results were obtained:

An aqueous KCl solution of 0.06% concentration was supplied to the apparatus and pressure of 140 lb. per square inch was applied. After transfer of 4.75 cubic inches of solution, the solution on the high pressure side was analyzed and found to contain 34 mg. of KCl whereas the solution on the low pressure side was found to contain 58 mg. of KCl.

The total amount of KCl contained in 9.5 cubic inches of solution was 93.5 mg. and the total amount of KCl recovered was 92 mg. The concentration on the high pressure side was found to be 0.043% and the concentration on the low pressure side was found to be 0.075%.

The tests show that the passage of the ionic solution through the membrane barrier is accompanied by a concentrating action, in the sense that the solution downstream of the permselective barrier is of a higher ionic concentration whereas the solution upstream of the barrier is depleted of ions.

The fluid which is present in the pores of the membranes 133, 134 and which, due to a peculiar property inherent in all permselective materials, has a relatively high ionic concentration is being displaced by the pressure which acts as a driving force or bias in a similar manner as the electric bias exerted by electrodes in an electrodialyzer. As solution of high ionic concentration is being forced from the pores of the membranes, the fluid in the pores is being replenished from the volume in the chamber 116. The high ionic concentration in the pores is maintained by preferential passage into the pores of ions which are accompanied only by so much solvent as is called for by the concentrating property of the permselective material.

The apparatus provides a path for anions through the membrane 133, and a path for cations through the membrane 134 in order to produce ionic balance in the concentrate requiring that for a certain number of anions passing through the barrier an equivalent number of cations pass therethrough.

If one of the membrane areas 133 or 134 is blocked so as to admit liquid to the other area only, no passage of concentrate takes place, regardless of the pressure applied, with exception of a small leakage flow of solution of the same concentration as the solution in the chamber 116. The phenomenon of leakage through permselective membranes is known in the art and is believed due to the inability of the bound charges in the permselective material to prevent passage of fluid particles through the pores by repelling ions of the same polarity as the bound charges. Inter alia, leakage is a function of the pore size of the permselective membranes.

The volume of liquid which may be treated depends on the size of the permselective areas of the membranes through which the liquid must pass.

FIGURES 3, 4, 5, 6 and 7 show forms of an apparatus in which the permselective membranes form part of a cylindrical surface.

Figure 3:
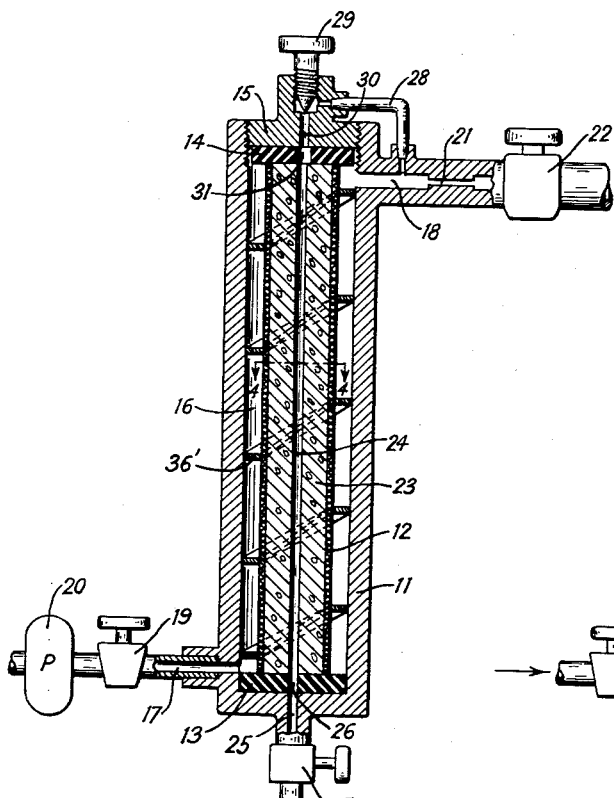
FIGURE 3 is a vertical cross-section through an illustrative form of apparatus for practicing the invention.
Figure 4:
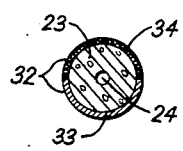
FIGURE 4 is a horizontal cross-section through an element of the apparatus shown in FIGURE 3, the section being taken on line 4—4 of FIGURE 3.

Referring to FIGURES 3 and 4, the housing 11 encloses a cylindrical structure 12 held between elastic gaskets 13 and 14 at the bottom and at a threaded cover 15 of the housing.

The outside diameter of the cylindrical structure 12 is smaller than the internal diameter of the housing 11 leaving a space or chamber 16 between the housing wall and the cylindrical structure into which fluid may enter through a supply duct 17 and from which it may flow through an outlet duct 18. The supply duct may be provided with a supply valve for interrupting the supply of fluid from a source of fluid under pressure represented by a pump 20.

The outlet duct 18 has a flow restricting member in it, represented by a capillary passage 21, for maintaining the interior space 16 about the cylindrical structure 12 under hydrostatic pressure. The outlet duct 18 may also contain an outlet valve 22.

The cylindrical structure 12 consists of a rigid porous and fluid pervious core 23 of substantial compressive strength having an interior bore or passage 24 communicating with a discharge passage 25 through a hole 26 in the gasket 13. The discharge passage may include a discharge valve 27.

Liquid may be supplied into the interior 24 of the core from any convenient source of supply, provided the pressure is lower than the pressure inside the space 16.

This may conveniently be accomplished by a branch duct 28 extending from the outlet duct 18 and including a needle valve 29 for reducing the pressure of the liquid entering the interior space 24 and also controlling its volumetric rate of flow. The needle controls the inflow into a passage 30 in the cover 15 whence the liquid enters the bore 34 through an aperture 31 in the gasket 14.

The core 23 is covered with a coating or film 32 of ion passage discriminating material. Referring particularly to FIGURE 4 is it seen that the coating or film 32 comprises two portions 33 and 34, the coating portion 33 being anion-permeable, cation-passage-resistant and the film portion 34 being cation-permeable and anion-passage-resistant.

The coating or film 32 may be composed of anionic and cationic portions of permselective membrane materials as are presently in use in electrodialyzers. The membranes are of a microporous structure to permit the passage of ions therethrough, the width of the pores being of the order of the size of the ions which the pores should permit to pass through, and into, the porous structure of the core.

The core structure 23 is macroporous, relatively speaking, that is to say that its pore size may be considerably larger. Porcelain, earthenware and ceramics with or without internal flow resistance reducing channels serve well as core materials.

Porous materials of natural or synthetic resin are also suitable as core materials, the principal requirement being sufficient compression resistance to the operating pressure, chemical inertness and sufficient physical strength to prevent damage in handling of individual cores which, as will be pointed out, may also be in flat sheet form.

Figure 10:
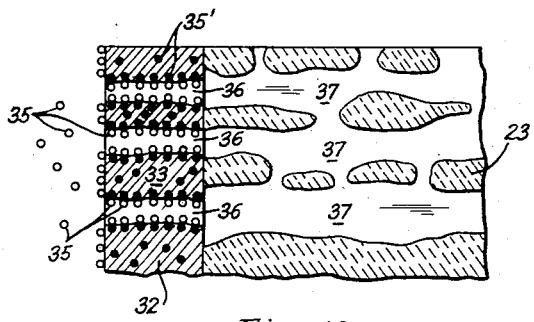
FIGURE 10 is a schematic illustration in a manner of a cross-section illustrating structure and operation of the ion discriminating elements in the devices shown in FIGURES 1 to 9.

FIGURE 10 is a diagrammatic representation of a core portion 23 with its overlying membrane portion 32. Fixed electric charges in the membrane material are indicated by black spheres 35' and adsorbed mobile ionic particles in the liquid are represented by light spheres 35. The mobile ions cling to the walls of the pores 36, their number being determined by the density with which fixed charges 35' are present in the membrane material 32. The hydrostatic pressure which, according to the invention, is applied tends to dislodge the adsorbed mobile ions in the pores 36 of the membrane and drives them into the larger pores 37 of the core material where they meet mobile ions of the opposite polarity which are passing through the corresponding membrane portion of a polarity opposite to that of the illustrated membrane portion 32. In this manner an ionic balance continues to exist in the solution outside the core and membrane in which ions of both polarities are present. Ionic balance exists in the pores of the membranes in which fixed charges in the membrane material are countered by a corresponding number of mobile ions. Ionic balance exists in the core because of passage into the core of ions of both polarities.

It was observed that if one membrane portion, for example the portion 133 in FIGURES 1 and 2, is covered up, no fluid passes through the barrier from the chamber 116 into the receptacle 118, except the very small amount which is due to leakage. No concentration action takes place under such circumstances, but the liquid leaking through the barrier is of the same ionic concentration as the liquid in the chamber 116. It is therefore necessary that an apparatus incorporating the invention is so constructed as to permit anions as well as cations to pass through the barrier.

As the ions 35 pass through the pores 36 of the respective membranes they take with them a certain amount of solvent in the form of so-called solvent shells which, according to prevailing theories, are shells of solvent molecules surrounding each ion. The ratio of solvent to ions is determined by the physical characteristics of the membrane material, more particularly the density with which fixed charges are present in the membrane material, this being, in effect, the cause of the concentrating action of the membranes.

Considering now the operation of the device, it may be assumed that liquid to be deionized, for example sea water, enters the apparatus through the inlet duct 17 under pressure. It may further be assumed that the outlet valve 22 and the discharge valve 27 are open and that a small amount of liquid is permitted to enter the interior passage 24 of the core. The positively charged sodium cations are attracted and absorbed by the cation-permeable coating 34 and the negatively charged chlorine anions are attracted and absorbed by the anion-permeable coating 33. The ions cover the surfaces of the coatings and also accumulate in the micropores of the coating by reason of adsorption. The hydrostatic pressure difference on opposite sides of the coating 32 causes the adsorbed ions to become dislodged and enter the liquid which slowly flows through the core in a direction opposite the flow of the liquid to be deionized. The liquid leaving through the discharge valve 27 is ion enriched, while the liquid leaving through the outlet valve has lost ions or, in other words, lost a portion or all of its salinity, in the case of sea water.

The flows of liquid are preferably so proportioned that the flushing liquid passing through the core is only a fraction, in terms of volume, of the flow passing through the deionization space or chamber 16. As a result the liquid discharged through the discharge valve 27 has many times the salt content of the liquid entering through the inlet duct 17 as shown by the above given tests. The concentrate may be discarded or used for purposes for which water or high salt concentration is required.

It was previously mentioned that the transfer of ions is accompanied by a limited transfer of solvent. This phenomenon is utilized in the modification of FIGURE 5. In this modification no flushing liquid is fed into the interior of the core, but all the liquid leaving the core through the outlet passage 27 entered the core by solvent transfer incidental to the ion transfer. This liquid volume comprises the transferred ions and their solvent shells plus a certain percentage of leakage liquid depending on the tightness of the membranes.

It has been observed that leakage losses become greater with an increase in the pressure difference in opposite sides of the coating surface 32. In order to prevent excessive leakage it is therefore desirable to operate with as low a pressure differential as possible. On the other hand, the removal of adsorbed ions from the micro-pores of the coating, i.e. the concentrating action, is also a function of the hydrostatic pressure difference, and the removal of adsorbed ions is the greater, the greater the hydrostatic pressure difference. The selection of the hydrostatic pressure differential for efficient operation is therefore a matter of compromise.

The operation is rendered more efficient by conducting the fluids through the apparatus in opposite directions or, in other words, in counterflow. It is easily apparent that the salt concentration is highest near the bottom of the apparatus and that the least concentration is near the top, since the fluid to be treated loses ions as it flows through the apparatus in an upward direction, while the core fluid increases in concentration during its downward passage through the core. It has been observed that, for a removal of a predetermined number of adsorbed ions, a greater hydrostatic pressure is required the greater the difference in concentration on opposite sides of the ion discriminating diaphragm. The counterflow arrangement incorporated in the illustrated apparatus results in the smallest possible concentration difference on opposite sides of the ion discriminating diaphragms thus permitting reduction of the hydrostatic pressure difference as compared to an installation in which the flows of fluid past the opposite sides of the diaphragms or coatings is in the same direction.

For efficient operation it is desirable to cause the same fluid particle to pass anion discriminating and cation discriminating diaphragm or coating portions in quick succession to prevent the fluid particle from tending to become alkaline and acid in succession by loss of anions and cations. In order to eliminate this tendency a helical guide member 36' may be inserted causing the fluid to flow past the anion permeable and the cation permeable coating portions 33 and 34 in quick succession.

Figure 6:
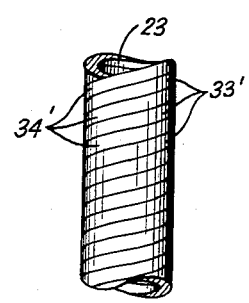
FIGURE 6 is an elevational view of an element of modified construction for use in the devices shown in FIGURES 3 and 5.
Figure 7:
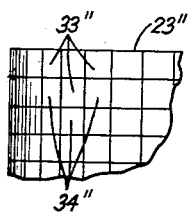
FIGURE 7 is a detailed view of a surface portion of an element of modified construction for the selective control of ions.

However, the use of a guide coil can be avoided by close spacing of the anion permeable and the cation permeable surface portions. FIGURE 6 illustrates a coating arrangement in which the coatings are applied to the core 23' as helical bands 33' and 34'. FIGURE 7 shows a mosaic type membrane comprising anion permeable and cation permeable surface elements 33" and 34" arranged in close proximity on a pressure resisting supporting surface 23" in such a way as to leave no surface element of the supporting member 23" uncovered.

In the apparatus shown in FIGURE 3 the valve 19 or the valves 22 and 27 may be omitted. It is obvious that if the valve 19 is closed the flow through the apparatus ceases and the valves 27 and 22 can be omitted. On the other hand, the valve 19 could be omitted and the apparatus be shut off by closing valves 22 and 27. In this latter instance, the apparatus is maintained under pressure and the full hydrostatic operating pressure is available as soon as the valves 22 and 27 are opened. This would not be the case if only one valve 19 were present since, in the latter instance, pressure must first be built up in the chamber 16 by the inflowing fluid.

Full opening of the valve 22 does not cause the pressure in the chamber 16 to drop below a predetermined operating pressure because of the presence of the restricted capillary passage 21 at which a substantial pressure drop occurs.

The ion discriminating material or coating 32 is relatively thin and need not be strong enough to stand up under the operating pressures without a suitable reinforcement. Reinforcement is provided by the macroporous core whose main purpose is to furnish a support for the ion discriminating coating to prevent the coating from collapsing under the pressure.

Figure 5:
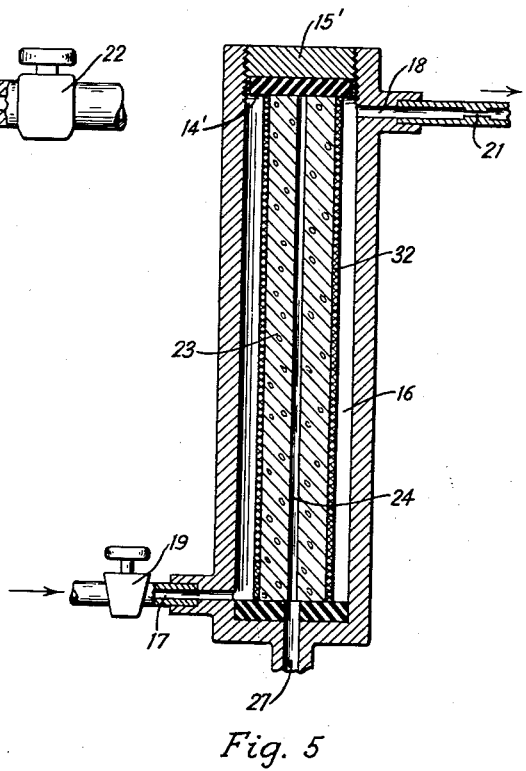
FIGURE 5 is a vertical cross sectional view illustrating a modified and simplified form of apparatus.

Leakage of liquid through the pores of the ion discriminating coating may furnish sufficient fluid for flushing the interior of the core. An illustrative form of apparatus utilizing the fluid seepage to advantage is shown in FIGURE 5. The apparatus corresponds in all respects to the apparatus shown in FIGURE 3 except for the absence of the branch supply duct for supplying liquid into the interior of the core. The threaded plug 15' and the gasket 14' have no passages therethrough. Fluid to be deionized enters through the inlet duct 17 controlled by the inlet valve 19, flows through the interior chamber 16 and leaves in deionized condition through the restricted outlet passage 18, 21. Concentrate passing through the ion discriminating coating 32 enters the core 23 towards the core passage 24 and leaves through the discharge passage 27.

Figure 8:
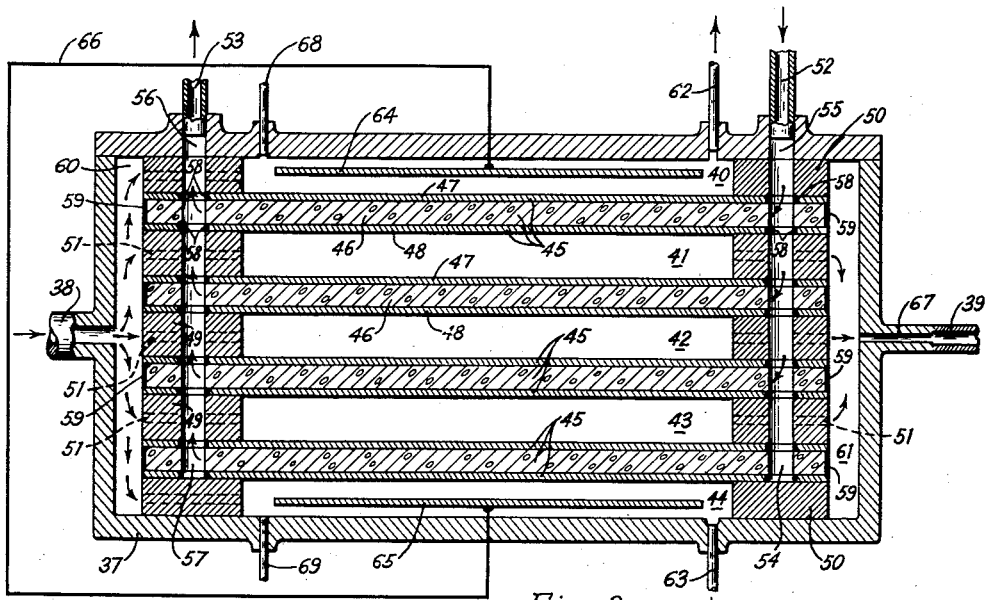
FIGURE 8 is a section through a multicellular apparatus for practicing the invention.
Figure 9:
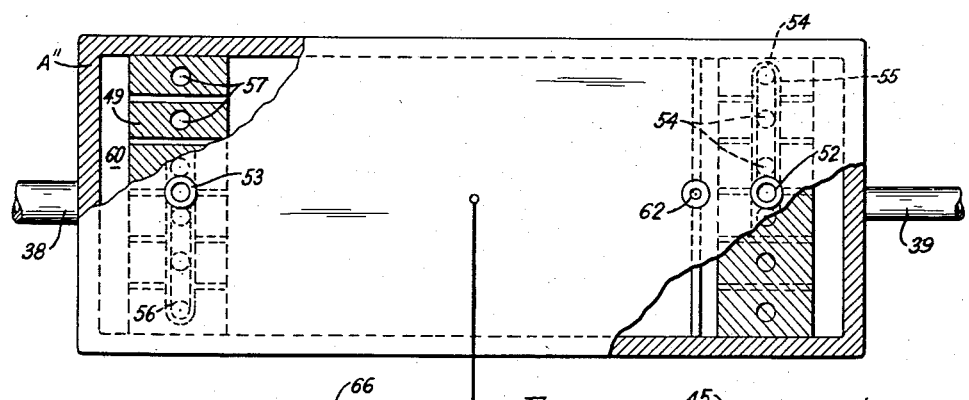
FIGURE 9 is an end view of the apparatus shown in FIGURE 8, portions of the apparatus being shown in section, such section being taken on lines 9—9.

A dialyzer of a large capacity is diagrammatically shown in FIGURES 8 and 9. The apparatus comprises a pressure resistant fluid tight housing 37 having an inlet duct 38 and an outlet duct 39. The interior space of the housing is subdivided into a plurality of chambers 40, 41, 42, 43 and 44 by partitions 45. Each partition comprises a central core lamination 46 of a porous rigid or flexible compression resistant material and face laminations 47 and 48 of anion-permeable, cation-passage-resistant material, and cation-permeable, anion-passage-resistant material, respectively.

The partitions 45 are separated by spacers 49 and 50. The spacers 49 have passages 51 therethrough through which fluid may enter, and through which fluid may leave, the chambers 40, 41, 42, 43 and 44. Other spacers 50 have no such passages for reasons which will become apparent.

A supply duct 52 supplies fluid to the core laminations and a discharge duct 53 discharges concentrate from the core laminations. The supply duct 52 is manifolded with respect to numerous individual ducts 54 by a manifold duct 55 in the housing. In a similar manner the discharge duct 53 is manifolded by a manifold duct 56 with respect to a plurality of individual discharge ducts 57.

The individual supply ducts 54 are formed by registering apertures in the several laminations 46, 47, 48 and spacers 49 and 50. The individual discharge ducts 57 are likewise formed by similar apertures in the laminations and the spacers.

The ion discriminating face laminations 47 and 48 are sealed with respect to the individual supply and discharge ducts 54 and 57, as shown at 58, and the porous core laminations are sealed at 59 their marginal edges to prevent entry of fluid into the core lamination from chambers 60 and 61 into which the ducts 38 and 39 extend. The side edges of the partitions extend from wall to wall of the housing and are sealed with respect thereto.

Separate discharge passages 62 and 63 are provided for the withdrawal of fluid from the terminal chambers 40 and 41 for reasons which will become apparent hereinafter. Electrodes 64 and 65 may be arranged in the terminal chambers 40 and 41, the terminals being connected by a lead 66.

The operation of the apparatus is substantially as follows: Fluid to be deionized is supplied under pressure through the inlet duct 38 and enters the inlet chamber 60 of the housing. It then flows through the passage 51 in the spacers into the several chambers 40, 41, 42, 43 and 44, thus exerting an equal amount of pressure to both sides of the three-ply partitions 45. The partitions thus are relieved from one-sided pressure, since the force acting on one ion-discriminating face lamination is transmitted through the porous rigid core 46 to the opposite ion-discriminating face lamination on which an equal, but oppositely directed pressure acts.

The fluid flowing through the chambers is depleted of ions and leaves the intermediate chambers 41, 42 and 43 through passages 51 in the spacers at the other end of the chambers, then enters the common outlet chamber 61 and flows into the outlet duct 39 which again may include a flow restricting member 67 to maintain a certain hydrostatic pressure in the chambers. Ions of the fluid to be deionized are adsorbed by the ion discriminating face laminations 47 and 48 and pass through their microporous structure by reason of the hydrostatic pressure maintained in the deionizing chamber. The ions enter the micro-porous structure of the core laminations 46 much in the same manner as was illustrated and described in connection with FIGURE 10. A certain amount of leakage fluid also enters the core laminations through the micro-pores of the face laminations thus adding to the volume of fluid supplied through the supply duct 52 for flushing the core laminations.

Anions reaching a core lamination through a face lamination from one chamber combine with cations entering the same core lamination through the other face lamination from the next chamber or cell and form a concentrate which then leaves the apparatus through ducts 57, manifold duct 56 and discharge ducts 53.

With possible exception of the terminal partitions bordering the terminal chambers 40 and 44, equal amounts of ions pass into the core laminations from both sides. In this manner the pH of the fluid in the core laminations is maintained equal to the pH of the fluid in the cells, even though the concentration of both fluids changes as a result of the dialysis.

Speaking of the terminal chambers, it is apparent that the fluid in the cells 40 and 44 is depleted by anions and cations, respectively, so that there remains a surplus of cations in the chamber 40 and a surplus of anions in the chamber 44. Separate ducts 62 and 63 are provided to prevent mixing of the products of the terminal chambers with the products of the intermediate chambers.

Nevertheless, if desired, the same mean pH may also be maintained in the terminal chambers by addition of a fluid having an anion surplus or a cation surplus, such fluid may be introduced through ducts 68 and 69.

The transfer of ions through the several ion discriminating combinations causes a potential to be built up tending to oppose the transfer of ions. This potential is diminished by the electrodes 64 and 65 connected to each other by the lead 66.

Figure 11:
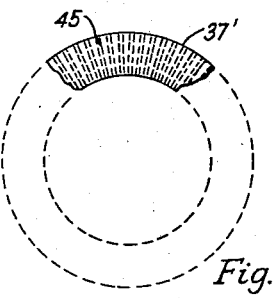
FIGURE 11 is a diagrammatic illustration of a dialyzer in which the individual chambers are arranged end to end to form an annulus.

FIGURES 8 and 9 must be considered as largely diagrammatic particularly with respect to the dimensions, some of which are enlarged and others reduced for the sake of clearness. In an actual installation the partitions are closely spaced, spaces of between 1 to 3 millimeters being particularly advantageous. Also the partition area is much larger than illustrated. The number of cells is considerably greater than shown, so that the relative influence of the terminal cells is negligible with respect to the total production. Terminal cells may be avoided altogether by an arrangement of the cells in annular fashion as illustrated in FIGURE 11. In an annular installation the partitions extend substantially radially, and it is evident that no terminal cells are present.

The apparatus shown in FIGURES 8 and 9 may be operated in such a position that the partitions 45 are substantially vertical, the fluid to be deionized entering through the duct 38 at the bottom and leaving through the duct 39 at the top. In this position an automatic flow control is operative which controls the volumetric rate of flow through the various cells in accordance with the specific gravity of the fluid. Assuming, for example, that the fluid in chamber 41 has a higher mean specific gravity than the fluid in chamber 42, the higher specific gravity will tend to slow the flow through the chamber 41 as compared to the flow through the chamber 42. As a consequence the fluid in the chamber 41 is exposed to the dialyzing diaphragms for a longer period of time than the flow in the neighboring cell, causing the deionization to proceed at a faster rate per volume unit than in the cell 42. As the specific gravity of the fluid in the chamber 41 is reduced as the result of the deionization, the flow velocity increases.

In this manner an automatic control of the branch flows through the several chambers is attained in a relatively simple way. A similar control is operative in some measure in the core laminations where the specific gravity also influences the rate of flow through the respective cores, provided that the porosity of the cores is such as to prevent relatively little flow resistance to the rather slow flow of fluid therethrough.

The partitions of the devices shown in FIGURES 8 and 9 may also be covered on both sides with a coating which is both anion permeable in certain spots and cation permeable in others, as shown in FIGURE 7. Such coatings may be produced by spraying through an appropriate checkerboard mask, so that first the surface elements 33″ are produced and then, after appropriate shifting of the mask, the surface elements 34″ are produced. If such coatings are applied to the partition cores, the electrodes 64 and 65 may be omitted since all partitions are electrically neutral.

In the event coatings of the type shown in FIGURE 7 are employed, anions and cations enter the partition from the same side and from the same chamber and are recombined in the core structure.

In the devices shown in FIGURES 8 and 9, regardless of the form of the coating, the supply, and particularly the discharge of concentrate through the discharge duct 53 is preferably maintained at a fraction of the total volumetric flow through the dilution chambers, a preferred range of ratios being that in which the flow through the core laminations is restricted to between one-half and one-twelfth of the volumetric flow passing through the dilution chambers.

It is convenient in this connection to compare the volumetric flows by reference to the volume entering the dilution chamber through the duct 38 and the volume leaving the core laminations through the withdrawal duct 53. Thus the volume of the fluid entering the dilution chambers includes that portion of the fluid which permeates the ion discriminating face laminations into the core laminations and the volume withdrawn through the duct 53 includes the fluid gain by reason of passage of fluid into the core laminations through the ion discriminating face laminations.

In an apparatus shown in FIGURES 8 and 9 the ions which enter each core lamination were not withdrawn from the same volume of fluid, but from two different volumes in two different chambers. Assuming that the apparatus is used for treating sea water, the sodium ions of the fluid in the chamber 42 pass through the cation-permeable face lamination 48 of the partition separating the chambers 41 and 42. The chlorine ions, however, enter the core lamination through the anion-permeable lamination 47 of the partition between the chambers 42 and 43. The concentrate in the latter partition is thus formed from chlorine ions originating in the chamber 43. This characteristic of the apparatus permits, broadly speaking, ions originating in different and separate cells to be combined to form a new desirable composition. In other words, it is thus possible to produce a new composition by combining ionic constituents withdrawn from two ion supplying fluids in neither of which the new composition is present. In this respect the apparatus of FIGURES 8 and 9 differs from the apparatus shown in FIGURES 3 and 4 in which the concentrate in the core is formed by recombining anions and cations withdrawn from the same volume of fluid.

Since the core members or core laminations primarily serve the purpose of reinforcing the ion discriminating portion, layer, coating, or film against the hydrostatic pressure directed towards the core, it is of course not absolutely necessary that a firm bond exists between the core and the ion discriminating material thereon. The ion discriminating material may therefore be in the nature of a film placed or stretched over the core, and the film may, as hereinbefore stated, either be uniformly anion selective or uniformly cation selective, or it may be both anion and cation selective by reason of the presence of surface elements in the film which are anion selective and other surface elements which are cation selective.

The membranes used in practicing the invention may be chosen from any of the known permselective membranes used in electrodialyzers. All of these membranes, as far as I am aware, have the same essential characteristics of porosity permitting fluid to pass therethrough and comprising bound electric charges by reason of which the passage of ions through the pores is controlled by repulsion of ions of the same polarity as the bound charges whereas ions of the opposite polarity are adsorbed through the pore walls. In the method of electrodialysis the adsorbed ions are displaced from the pores by an applied electrical bias in that the anions tend to move towards the anode and the cations tend to move towards the cathode. The displacement, or flow, of ions continues as long as there are new ions available in the fluid which is being deionized to enter the pores and take the place of the displaced ions. A second condition of the flow of ions is the condition of electroneutrality which requires that for a certain number of ions leaving or entering a fluid space an equivalent number of ions of the opposite polarity must enter or leave the space, respectively. In the present invention the driving force or bias is hydrostatic pressure.

The pressure is not critical, but depends on the concentration of the ionic fluids on opposite sides of the membranes. If the ion concentration on both sides of the barrier or membrane is the same, practically no pressure is required to drive ions through the micropores of the permselective barriers, except the pressure necessary to overcome flow resistance. If the ionic concentration on the far side of the permselective barrier is greater than on the near side, the applied pressure must of course exceed the osmotic counterpressure existing under the circumstances.

As tests indicate, pressures of the order to 10 to 200 pounds per square inch are practical pressures for conventional membranes having a thickness of the order of 1 mm. or less and being backed by a relatively macroporous core as represented, for example, by porous porcelain commonly used as a filter.

The porosity of the membrane lies preferably between 20 A. and 200 A. The core material may have a pore size in the range of 500 A. to 1 mm. the pore volume being in the range of 10 to 90 percent of the total volume.

Evidently the invention may be applied to, and practiced by, various forms of apparatus and is not limited to the specific devices illustrated in the drawings. Likewise, many kinds of chemical compositions may be decomposed, recomposed or transformed by treatment according to the invention.

In this connection ions of compositions may even be replaced by larger electrically charged particles of colloidal size by treatment according to the present method and in the described type of apparatus.

Thus numerous changes, additions, omissions, substitutions and modifications in the apparatus and method steps, as well as other applications of the method and apparatus may be made without departing from the spirit, the teaching, and the principles of the invention.

What is claimed is:

1. The method of deionizing an ionic solution and producing an ionic concentrate, which comprises exposing the solution to one side of a microporous ion permeable barrier, one portion of which is permeable to ions of one plarity and passage resistant to ions of the opposite polarity, and another portion of which is permeable to ions of said opposite polarity and passage resistant to ions of said one polarity; and applying a higher hydrostatic pressure to the solution on said one side of the barrier than the pressure on the opposite side sufficient to drive ionic concentrate from the pores of the barrier to the other side.

2. The method of deionizing an ionic solution which comprises moving the solution past one side of a microporous permselective barrier in a direction substantially parallel to the barrier surface, one portion of the barrier being permeable to ions of one polarity and passage resistant to ions of the opposite polarity, and another portion being permeable to ions of said opposite polarity and passage resistant to ions of said one polarity; and applying a higher hydrostatic pressure to the solution on said one side of the barrier than the pressure on the opposite side sufficient to drive ionic concentrate from the pores of the barrier to the opposite side.

3. The method of deionizing an ionic solution which comprises exposing the solution to one side of a microporous ion permeable barrier, one portion of which is permeable to ions of one polarity and passage resistant to ions of the opposite polarity, and another portion of which is permeable to ions of said opposite polarity and passage resistant to ions of said one polarity; driving ionic concentrate through said barrier by applying higher hydrostatic pressure to the solution on the one side than the pressure on the other side; and removing ionic concentrate from the other side of the barrier.

4. The method of deionizing an ionic solution which comprises exposing the solution to one side of a microporous ion permeable barrier, one portion of which is permeable to ions of one polarity and passage resistant to ions of the opposite polarity, and another portion of which is permeable to ions of said opposite polarity and passage resistant to ions of said one polarity; maintaining said solution in a state of flow past the surface of said barrier; applying a higher hydrostatic pressure to the solution of said one side than the pressure on the other side; and removing ionic concentrate from the other side of the barrier.

5. The method of deionization by removing ions of both polarities from an ionic solution and transferring them into another solution which comprises separating said two solutions by a permselective barrier one portion of which is permeable to ions of one polarity and passage resistant to ions of the opposite polarity and another portion of which is permeable to ions of said opposite polarity and passage resistant to ions of said one polarity; and applying a higher hydrostatic pressure to said one solution than to said other solution to drive ions and solvent through said barrier; and maintaining in a state of flow past the barrier at least said one solution.

6. The method of removing ions of a certain polarity from one volume of ionic solution and transferring them into another volume which comprises separating said two volumes by a permselective barrier permeable to ions of said certain polarity and passage resistant to ions of the opposite polarity; applying a higher hydrostatic pressure to said one volume than to said other volume to drive ions of said certain polarity and solvent through said barrier, and simultaneously removing from said one volume, and moving into said other volume, ions of said opposite polarity to maintain an ionic balance in both volumes.

7. The method of removing ions of both polarities from one volume of ionic solution and transferring them into another volume of ionic solution which comprises arranging the two volumes on opposite sides of, and in contact with, a microporous barrier of ion exchange material within which anionic solution ions and cationic solution ions are present as mobile ions in an ionic concentration greater than the ionic concentration of said one solution; and applying a higher hydrostatic pressure to said one volume than to said other volume, the pressure being sufficiently high to drive mobile ions and their solvent shells from said barrier into said other volume.

8. The method of decreasing the ion content of liquids by a transfer of ions through a permselective semi-permeable membrane which, in combined group of steps, comprises exposing the liquid to be deionized to a permselective membrane capable of adsorbing mobile ions of both polarities within its pores, and exerting a hydrostatic pressure on the side of the fluid to be deionized sufficiently high to displace the adsorbed ions and their solvent shells to the other side of the membrane; and removing the ions on the other side by a flow of a liquid.

9. The method of decreasing the ion content of liquids by the transfer of ions through permselective semi-permeable membranes which, in a combined group of steps, comprises exposing the liquid to be deionized to one side of a cation-permeable, anion-passage-impeding membrane, and simultaneously exposing the same liquid to one side of an anion-permeable, cation-passage-impeding membrane; maintaining a flow of the liquid at least past said one side of the said membranes; and maintaining a higher hydrostatic pressure on the side of the liquid to be deionized, the difference in pressures being sufficient to drive ionic liquid in the pores of said membranes to the other side.

10. An apparatus for changing the ion content of liquids by ion transfer, the apparatus comprising, in combination, a housing; a porous rigid member within said housing, said member being of sufficient strength to withstand a substantial pressure differential and having an exterior surface exposed towards the inside of said housing; a coating of permselective material on said exterior surface for controlling the passage of ionic liquid through said surface into said member, said coating comprising an anion-permeable, cation-passage-resistant portion and a cation-permeable, anion-passage-resistant portion, said two portions forming substantially the sole passage for ionic concentrate from the interior space of the housing into the interior of said member; means for collecting ion-enriched liquid from the interior of said member; and means for increasing the hydrostatic pressure in said housing, acting on one side of said coating over the pressure in said membrane on the other side of said coating sufficiently to displace ionic concentrate from said permselective material into said member.

11. An apparatus for changing the ion content of liquid by ion transfer, comprising, a hollow member of substantially rigid porous and fluid-pervious material of sufficient strength to withstand a substantial pressure differential and having an inside surface and an outside surface; a coating of ion exchange material on one of said surfaces for controlling the ion passage through the coating into said member, said coating comprising a first portion permeable to ions of one polarity and passage resistant to ions of the opposite polarity and a second portion permeable to ions of said opposite polarity and passage resistant to ions of said one polarity, both said portions forming substantially the sole path for ionic concentrate through said coating into the interior of the body of said member; means for conducting liquid to be deionized to the space on the exposed side of said coating; means for withdrawing ion enriched liquid passing from the other side of said coating into the body of said member; and means for increasing the hydrostatic pressure on said exposed side of said coating over the pressure on the other side sufficiently to displace ionic concentrate from said ion exchange material into said porous member.

12. An apparatus for changing the ion content of liquids by ion transfer, comprising, in combination, a housing; a support of substantially rigid porous and fluid-pervious material in said housing; a coating of ion exchange material permeable to ions of one polarity and passage resistant to ions of the opposite polarity on a portion of the outside surface of said support for admitting ions of said one polarity through said portion into said support; a coating of ion exchange material permeable to ions of said opposite polarity and passage resistant to ions of said one polarity on another portion of the outside surface of said support for admitting anions through said other portion into said support, said one portion and said other portion forming substantially the sole passage for ionic concentrate from the exterior of said support to the interior; an inlet passage and an outlet passage in said housing exteriorly of said support for liquid to be deionized; a flow restriction in said outlet passage for maintaining a hydrostatic pressure in said housing; a discharge passage leading from the interior of said support for the discharge of ion enriched liquid therefrom; and means for applying a hydrostatic pressure inside said housing sufficient to drive ionic concentrate from said coating into said support.

13. An apparatus for changing the ion content of liquids by ion transfer, comprising, in combination, a housing; a member of substantially rigid porous and fluid-pervious material in said housing; a coating of cation-permeable, anion-passage-resistant material on a portion of the outside surface of said member for admitting cations through said portion into said member; a coating of anion-permeable, cation-passage-resistant material on another portion of the outside surface of said member for admitting anions through said other portion into said member, said one portion and said other portion forming substantially the sole passage for ionic concentrate from the exterior of said member to the interior; an inlet passage leading into said housing exteriorly of said member; an outlet passage leading from the space of said housing exteriorly of said member; a flow restricting element in said outlet passage for maintaining a higher hydrostatic pressure in said housing than in said member; an admission passage leading from the space of said housing exteriorly of said member into the interior of said member; and a discharge passage leading from the interior of said member.

14. An apparatus as set forth in claim 13 in which the admission passage extends from said outlet passage, including means for controlling the flow of liquid flowing through said admission passage.

15. An apparatus for changing the ion content of liquids by ion transfer, the apparatus comprising, a housing; a plurality of partitions in said housing, certain of said partitions comprising a core of a rigid porous and fluid-pervious material, and a face layer of ion exchange material on opposite core surfaces, a portion of the face layer of each partition being permeable to ions of one polarity and passage resistant to ions of the opposite polarity, the remaining portion of the face layer of the respective partition being permeable to ions of said opposite polarity and passage resistant to ions of said one polarity; duct means for the inlet of liquid to be deionized into, and the outlet of deionized liquid out of, said housing exteriorly of said partitions; duct means for withdrawing ion enriched liquid from the core; and means for maintaining a hydrostatic overpressure in said housing exteriorly of said face layers with respect to said withdrawing duct means sufficiently high to drive ionic concentrate from said layers into said partitions.

16. An apparatus for changing the ion content of liquids by ion transfer, the apparatus comprising, a housing; a plurality of porous members in the housing, said members comprising a core of a rigid porous and fluid-pervious material, and at least one outer layer of ion exchange material, a certain portion of the outer layer of each member being permeable to ions of one polarity and passage-resistant to ions of the opposite polarity, the remainder of the layer being permeable to ions of said opposite polarity and passage resistant to ions of said one polarity, said certain portion and said remainder forming substantially the sole passage for ionic concentrate from the exterior of the respective member to its interior; means for passing a flow of a liquid to be deionized into said housing exteriorly of said members; means for passing liquid to be ion enriched through said cores; and means for maintaining the liquid in the housing at a higher hydrostatic pressure than the liquid in said cores, the pressure difference being sufficiently high to drive ionic concentrate from said layers into said members.

17. An apparatus for changing the ion content of liquids by ion transfer, the apparatus comprising, in combination, a housing; a layer of ion exchange material forming within said housing a first chamber lying on one side of said layer, said layer comprising at least one portion permeable to ions of one polarity and passage resistant to ions of the opposite polarity, and another portion which is permeable to ions of said opposite polarity and passage resistant to ions of said one polarity; a substantially rigid fluid pervious member supporting said layer on the other side against hydrostatic pressure acting on said layer from said one side; means forming a liquid inlet into said first chamber; means forming a discharge passage for liquid passing through said layer and into said fluid pervious member; and means for maintaining a higher hydrostatic pressure on the one side of said layer than the pressure on the other side, the pressure difference being sufficiently great to drive ionic concentrate from said layers into said members.

18. An apparatus for changing the ion content of liquids by ion transfer, the apparatus comprising, in combination, a housing; a layer of ion exchange material forming within said housing a first chamber lying on one side of said layer, said layer comprising at least one portion permeable to ions of one polarity and passage resistant to ions of the opposite polarity, and another portion which is permeable to ions of said opposite polarity and passage resistant to ions of said one polarity; a fluid-pervious supporting member for supporting said layer on the other side against hydrostatic pressure acting on said layer from said one side; means forming a liquid inlet into said first chamber; means forming a discharge passage for liquid passing through said layer and into said fluid pervious member; and means for maintaining a higher hydrostatic pressure on the one side of said layer than the pressure on the other side, the pressure difference being sufficiently great to drive ionic concentrate from said layer into said supporting member.

19. An apparatus for changing the ion content of liquids by ion transfer, the apparatus comprising, in combination, a housing; a layer of ion exchange material subdividing the housing into at least two chambers, said layer comprising at least one portion permeable to ions of one polarity and passage resistant to ions of the opposite polarity and another portion permeable to ions of the opposite polarity and passage resistant to ions of said one polarity; a fluid pervious supporting member in the other chamber for supporting said layer against hydrostatic overpressure in the one chamber with respect to the pressure in the other chamber; means forming a liquid inlet and a liquid outlet for said one chamber for passage therethrough of liquid to be deionized; means forming a liquid discharge passage for withdrawing ionic concentrate from said other chamber; and means for maintaining a higher hydrostatic pressure in said one chamber than in the other chamber, the pressure difference being sufficiently great to drive ionic concentrate from said layer into said supporting member.

20. An apparatus for changing the ion content of liquids by ion transfer, the apparatus comprising, in combination, a porous ion exchange barrier within which anionic solution ions and cationic solution ions are present as mobile ions in a concentration higher than in the liquid to be treated; means for conducting liquid to be deionized to one side of said barrier; a porous supporting member mechanically supporting said barrier on the other side against hydrostatic overpressure on said one side; means for maintaining a hydrostatic overpressure on said one side with respect to the other side high enough to drive ionic concentrate from said barrier into said supporting member; and means for collecting ionic concentrate so driven from said barrier into said supporting member.

21. An apparatus for changing the ion content of liquids by ion transfer, the apparatus comprising, in combination, a porous ion exchange barrier within which anionic solution ions and cationic solution ions are present as mobile ions in a concentration higher than in the liquid to be treated; means for flowing liquid to be treated past one side of said barrier; a porous supporting member mechanically supporting said barrier on the other side against hydrostatic overpressure on said one side; means for maintaining a hydrostatic overpressure on said one side with respect to the other side high enough to drive ionic concentrate out of said barrier into said supporting membrane; and means for collecting ionic concentrate so driven from said barrier into said supporting member.

(References on following page)

References Cited in the file of this patent

UNITED STATES PATENTS

| | | |
|---|---|---|
| 1,825,631 | Horvath | Sept. 29, 1931 |
| 1,868,955 | Tachikawa | July 26, 1932 |
| 1,905,806 | Clark | Apr. 25, 1933 |
| 2,111,808 | Saddington et al. | Mar. 22, 1938 |
| 2,124,861 | Saddington et al. | July 26, 1938 |
| 2,404,872 | Walker | July 30, 1946 |
| 2,502,614 | Zender | Apr. 4, 1950 |
| 2,636,852 | Juda | Apr. 28, 1953 |
| 2,689,826 | Kollsman | Sept. 21, 1954 |
| 2,694,680 | Katz et al. | Nov. 16, 1954 |
| 2,741,595 | Juda | Apr. 10, 1956 |
| 2,848,403 | Rosenberg | Aug. 19, 1958 |
| 2,872,407 | Kollsman | Feb. 3, 1959 |

FOREIGN PATENTS

| | | |
|---|---|---|
| 179,919 | Great Britain | July 24, 1923 |
| 694,223 | Great Britain | July 15, 1953 |
| 709,179 | Great Britain | May 19, 1954 |
| 1,093,037 | France | Nov. 17, 1954 |

OTHER REFERENCES

Sollner: "Membranes of High Ionic Selectivity," 97 J. Electrochemical Soc., 139C–151C (1950).

Hober: "Membrane Permeability to Solutes," 16 Physiological Reviews, 52–102, especially pages 71, 75–80, 86 and 87 (1936).

Wyllie et al.: "Development of Membranes," 54 J. Physical and Colloid Chem., 210–213 (1950).

UNITED STATES PATENT OFFICE
CERTIFICATE OF CORRECTION

Patent No. 2,987,472                 June 6, 1961

Paul Kollsman

It is hereby certified that error appears in the above numbered patent requiring correction and that the said Letters Patent should read as corrected below.

Column 7, line 47, for "or" read -- of --; column 12, line 23, for "to", first occurrence, read -- of --; column 13, line 17, for "of" read -- on --; line 22, for "an" read -- one --; line 59, after "in" insert -- a --.

Signed and sealed this 1st day of May 1962.

(SEAL)
Attest:

ERNEST W. SWIDER
Attesting Officer

DAVID L. LADD
Commissioner of Patents